2,792,418
Patented May 14, 1957

2,792,418

ACYL-BUTYRIC ACIDS

Jean Druey, Riehen, and Hans O. Isler, Bottmingen, Switzerland, assignors to Ciba Pharmaceutical Products, Inc., Summit, N. J.

No Drawing. Application December 21, 1954, Serial No. 476,830

Claims priority, application Switzerland December 29, 1953

8 Claims. (Cl. 260—520)

This invention relates to new γ-acyl-butyric acids of the formula

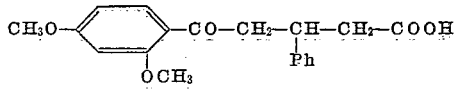

in which Ph represents a phenyl radical, which may also contain a substituent, e. g., a lower alkyl radical or a lower alkoxy radical, e. g., methoxy or a halogen atom, e. g., chlorine and also salts of these compounds.

The invention relates more especially to β-phenyl-γ-(2,4-dimethoxy-benzoyl)-butyric acid of the formula

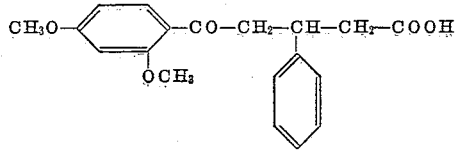

and salts thereof, such as metal salts, especially alkali metal and alkaline earth metal salts, or ammonium salts.

As compared with known compounds the new γ-acyl-butyric acids and their salts possess valuable pharmacological properties. They exhibit a strong choleritic action. They are useful as medicaments and can be used for instance in dysfunctions and dyskinesias of the gall-bladder and in liver affections.

The new compounds are obtained by reacting resorcinol dimethyl ether with an acid anhydride of the formula

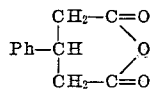

wherein Ph has the above given meaning, in the presence of aluminum chloride. The reaction is advantageously carried out in the presence of an inert solvent, preferably nitrobenzene.

Depending on the reaction conditions the new compounds are obtained in the form of the free acids or their salts, such as metal, for example, alkali metal or alkaline earth metal salts or ammonium salts. The free acids can be obtained in the usual manner from the salts. Therapeutically useful salts can be obtained from the acids also by reacting them with the corresponding metal hydroxides.

The new compounds are used as medicaments in the form of pharmaceutical preparations which contain the new acids or their salts in admixture with an organic or inorganic carrier which is therapeutically useful, for example, for enteral or parenteral administration. The carrier advantageously consists of a substance which does not react with the new compound, for example, water, gelatine, lactose, starch, magnesium stearate, talc, a vegetable oil, a benzyl alcohol, gum, sorbitan mono-laurate, a polyalkylene glycol, petroleum jelly, cholesterol or another known medicinal carrier. The pharmaceutical preparations may be in the form, for example, of tablets or dragees, or in liquid form as solutions, suspensions or emulsions. If desired, they may be sterilized and/or may contain auxiliary substances, such as preserving, stabilizing, wetting or emulsifying agents, salts for controlling the osmotic pressure or buffers. They may also contain other therapeutically useful substances. These pharmaceutical preparations are made in the usual way.

The following examples illustrate the invention, the parts being by weight unless otherwise stated and the relationship of parts by weight to parts by volume being the same as that of the gram to the cubic centimeter:

Example 1

1.9 parts of aluminum chloride is introduced in small portions at a low temperature into a well stirred solution of 1 part of resorcinol dimethyl ether and 1.4 parts of β-phenyl-glutaric anhydride in 8.6 parts by volume of nitrobenzene. When the introduction is complete the whole is stirred for a few hours longer while cooling with ice, and allowed to stand overnight, and the whole is then poured on to ice and the nitrobenzene is driven off by distillation with steam. The residue of the steam distillation is cooled well, filtered with suction, and the filter residue is taken up in an excess of caustic soda solution of 2 percent strength. The solution is clarified with animal charcoal and acidified with 2 N-hydrochloric acid. The mixture is then cooled well and filtered with suction. The filter residue is recrystallized first from dilute acetic acid (1:1) and then from ethyl acetate. There is obtained β-phenyl-γ-(2,4-dimethoxy-benzoyl)-butyric acid of the formula

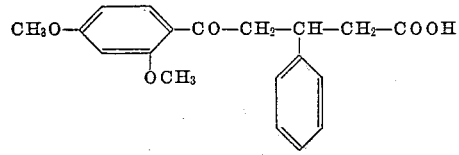

melting at 113–1115° C.

EXAMPLE 2

10.7 parts of aluminum chloride are introduced in small portions at 0–5° C. into a well stirred solution of 5.5 parts of resorcinol dimethyl ether and 8.8 parts of β-(para-methoxyphenyl)-glutaric anhydride in 50 parts by volume of dry nitrobenzene. The whole is then stirred for a further 3 hours while cooling with ice, and is allowed to stand overnight. The whole is then poured onto 110 parfs of ice and the mixture is distilled with steam until all the nitrobenzene has been expelled. The distillation residue is poured off, the resin is taken up in 150 parts by volume of a 1 N-solution of caustic soda and extracted with ether. The aqueous solution, after being clarified with animal carbon, is acidified with concentrated hydrochloric acid and exhaustively extracted with ether. The ethereal solution, after being dried over sodium sulfate, is evaporated to dryness. There remains behind β - (para-methoxy - phenyl) - γ - (2,4 - dimethoxybenzoyl)-butyric acid of the formula

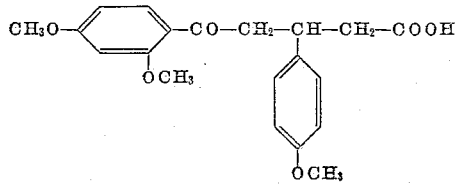

which melts at 122–124° C. after recrystallization from methanol.

The β-(para-methoxyphenyl)-glutaric anhydride used as starting material may be prepared as follows:

11.9 parts of β-(para-methoxyphenyl)-glutaric acid are boiled under reflux for 3 hours with 100 parts by volume of acetic anhydride, then acetic acid and acetic anhydride are distilled off under 12 mm. pressure of mercury, the residue is recrystallized from 180 parts by volume of benzene. The resulting β-(para-methoxyphenyl)-glutaric anhydride melts at 155–157° C.

EXAMPLE 3

12.2 parts of aluminum chloride are introduced in small portions at 0–5° C. into a well stirred solution of 6.3 parts of resorcinol dimethyl ether and 10.0 parts of β-(para-chlorophenyl)-glutaric anhydride in 50 parts by volume of dry nitrobenzene. When the introduction is complete the whole is stirred for a further 3 hours while cooling with ice and is allowed to stand overnight. The mixture is then poured on to 120 parts of ice, and distilled with steam until all the nitrobenzene has been expelled. The distillation residue is poured off, the resin is taken up in 120 parts by volume of a 1 N-solution of caustic soda and extracted with ether. The aqueous solution, after clarification with animal carbon, is acidified with concentrated hydrochloric acid and exhaustively extracted with ether. The ethereal solution, after being dried over sodium sulfate, is evaporated to dryness. The residual glassy mass consists of β-(para-chlorophenyl)-γ-(2,4-dimethoxybenzoyl)-butyric acid of the formula

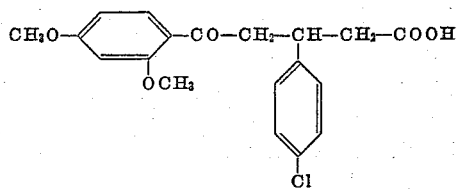

After recrystallization from methanol it melts at 104–106° C.

The β-(para-chlorophenyl)-glutaric anhydride used as starting material may be prepared as follows:

28.0 parts of para-chlorobenzaldehyde, 52.0 parts of ethyl acetoacetate, 4 parts by volume of piperidine and 10 parts by volume of ethanol of 95 percent strength are mixed together, the mixture is allowed to stand for 15 hours, and the reaction product is recrystallized from 200 parts by volume of ethanol of 95 percent strength. The resulting para-chlorobenzylidene-bis-acetoacetic acid ester melts at 153–156° C.

To 43 parts of the ester is added a warm solution of 195 parts of potassium hydroxide in 150 parts by volume of water, and the whole is heated while stirring for one hour on a boiling water bath. After cooling the mixture, there are added 700 parts by volume of water, and the mixture is extracted with ether. The clarified aqueous solution is acidified with concentrated hydrochloric acid, the precipitate is filtered off with suction, and recrystallized from 400 parts by volume of water. The resulting β-(para-chlorophenyl)-glutaric acid melts at 166–168° C.

15.0 parts of the latter acid are boiled for 3 hours under reflux with 120 parts by volume of acetic anhydride. Then the acetic acid and the acetic anhydride are distilled off under 12 mm. pressure of mercury, and the residue is recrystallized from 60 parts by volume of benzene. There is obtained β-(para-chlorophenyl)-glutaric anhydride melting at 131–133° C.

From the afore-described β-phenyl-γ-(2,4-dimethoxy-benzoyl)-butyric acids, salts can be obtained in the usual manner. The sodium salts, for example, are obtained by reacting the acids with the calculated quantity of caustic soda solution, evaporating the solution and recrystallizing the residue from alcohol, e. g. isopropanol.

An advantageous procedure of obtaining the sodium salt of β-phenyl-γ-(2,4-dimethoxy-benzoyl)-butyric acid is as follows:

24.15 parts of sodium chips are entered into 3200 parts by volume of isopropanol. When all of the sodium has dissolved, 328 parts by weight of β-phenyl-γ-(2,4-dimethoxybenzoyl)-butyric acid are added. 128 parts by volume of water are added dropwise to the boiling solution. A small quantity of charcoal is added and the reaction mass maintained at the boiling temperature for another quarter of an hour while stirring. The product is suction-filtered and the filtrate cooled while it is being stirred. It is allowed to stand overnight and then suction-filtered, and the filter residue dried at 75–80° C. under a pressure of 12 mm. of mercury.

The calcium salt may be prepared by reacting the sodium-salt with calcium chloride.

From the compounds obtained by the process of this invention, pharmaceutical preparations can be made in the usual manner, especially from sodium β-phenyl-γ-(2,4-dimethoxy-benzoyl)-butyrate.

A. *Tablets*

|  | Mg. |
|---|---|
| Sodium β-phenyl-γ-(2,4-dimethoxy-benzoyl)-butyrate | 250.00 |
| Calcium triphosphate | 100.00 |
| Gelatine | 1.00 |
| Wheat starch | 50.00 |
| Arrowroot | 50.00 |
| Magnesium stearate | 3.00 |
| Talc | 46.00 |
|  | 500.00 |

The sodium β-phenyl-γ-(2,4-dimethoxy-benzoyl)-butyrate is mixed with the calcium-triphosphate and sieved. The gelatine is dissolved in water, and part of the wheat starch pasted with the solution. The paste is used to treat the mixture of sodium β-phenyl-γ-(2,4-dimethoxy-benzoyl)-butyrate and calcium triphosphate. The remainder of the wheat starch is added, and the mass granulated and dried. A lubricant, e. g., magnesium stearate, is added before tableting.

B. *Ampoules*

|  | Mg. |
|---|---|
| Sodium β-phenyl-γ-(2,4-dimethoxy-benzoyl)-butyrate; distilled water to make up 1 cc. | 100.00 |

If desired, the stability of this solution can be increased by adding propylene glycol or sorbitan monolaurate, or a combination thereof with a polyoxyalkylene derivate, e. g., polyethylene glycol having an average molecular weight of 4000.

What is claimed is:

1. A member of the group consisting of γ-acyl-butyric acids of the formula:

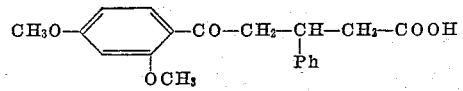

wherein Ph represents a member of the group consisting of phenyl, chloro-phenyl, and lower alkoxy-phenyl and the alkali metal, alkaline earth metal and ammonium salts thereof.

2. β-Phenyl-γ-(2,4-dimethoxy - benzoyl) - butyric acid.
3. Alkali metal of the compound of claim 2.
4. The sodium salt of the compound of claim 2.
5. β-(p-methoxy-phenyl)-γ-(2,4 - dimethoxy - benzoyl)-butyric acid.
6. Alkali metal of the compound of claim 5.
7. β-(p-chloro - phenyl) - γ-(2,4 - dimethoxy - benzoyl)-butyric acid.
8. Alkali metal of the compound of claim 7.

References Cited in the file of this patent

UNITED STATES PATENTS 2,654,778    Burtner    Oct. 6, 1953